US011869696B2

(12) United States Patent
Klesyk et al.

(10) Patent No.: US 11,869,696 B2
(45) Date of Patent: Jan. 9, 2024

(54) ELECTRONIC COMPONENT

(71) Applicant: Coilcraft, Incorporated, Cary, NC (US)

(72) Inventors: Andrzej Klesyk, Lake in the Hills, IL (US); Scott D. Hess, Crystal Lake, IL (US); Lawrence B. Lestarge, Algonquin, IL (US)

(73) Assignee: Coilcraft, Incorporated, Cary, IL (US)

( * ) Notice: Subject to any disclaimer, the term of this patent is extended or adjusted under 35 U.S.C. 154(b) by 357 days.

(21) Appl. No.: 16/434,758

(22) Filed: Jun. 7, 2019

(65) Prior Publication Data

US 2019/0287707 A1 Sep. 19, 2019
US 2023/0178284 A9 Jun. 8, 2023

Related U.S. Application Data

(63) Continuation of application No. 15/067,375, filed on Mar. 11, 2016, now Pat. No. 10,319,507, which is a (Continued)

(51) Int. Cl.
*H01F 27/00* (2006.01)
*H01F 27/04* (2006.01)
(Continued)

(52) U.S. Cl.
CPC ........... *H01F 27/04* (2013.01); *H01F 27/027* (2013.01); *H01F 27/24* (2013.01);
(Continued)

(58) Field of Classification Search
CPC ........ H01F 27/027; H01F 27/04; H01F 27/24; H01F 27/255; H01F 27/2823;
(Continued)

(56) References Cited

U.S. PATENT DOCUMENTS 1,994,534 A 4/1933 Robinson
2,118,291 A 5/1938 Bollman
(Continued)

FOREIGN PATENT DOCUMENTS

CH 179582 9/1935
CN 1304145 A 7/2001
(Continued)

OTHER PUBLICATIONS

Enescu, E., et al., “Composite Materials From Surface Insulated Iron Powders,” Romanian Reports in Physics, vol. 56, No. 3, pp. 487-493, 2004, 7 pp.
(Continued)

*Primary Examiner* — Paul D Kim
(74) *Attorney, Agent, or Firm* — Fitch, Even, Tabin & Flannery LLP

(57) ABSTRACT

An electronic component includes a wire winding wound around a central axis. The wire winding having first and second ends, and first and second terminals are connected to or formed by the first and second ends. The terminals provide electrical contacts for connecting the component into a circuit. The component has a wet press molded body made of a mixture of magnetic and non-magnetic material that is heated and pressed about the wire winding. The wet press molded body leaves at least a portion of the terminals exposed for mounting the component to the circuit.

21 Claims, 8 Drawing Sheets

Related U.S. Application Data continuation of application No. 12/885,045, filed on Sep. 17, 2010, now Pat. No. 9,318,251, which is a continuation of application No. 11/836,043, filed on Aug. 8, 2007, now abandoned.

(60) Provisional application No. 60/821,911, filed on Aug. 9, 2006.

(51) Int. Cl.

| | |
|---|---|
| ***H01F 27/02*** | (2006.01) |
| ***H01F 27/29*** | (2006.01) |
| ***H01F 27/32*** | (2006.01) |
| ***H01F 27/24*** | (2006.01) |
| ***H01F 27/28*** | (2006.01) |
| *H01F 3/12* | (2006.01) |
| *H01F 27/255* | (2006.01) |
| *H01F 41/10* | (2006.01) |
| *H01F 17/04* | (2006.01) |

(52) U.S. Cl.
CPC ......... *H01F 27/2823* (2013.01); *H01F 27/29* (2013.01); *H01F 27/292* (2013.01); *H01F 27/32* (2013.01); *H01F 3/12* (2013.01); *H01F 27/255* (2013.01); *H01F 41/10* (2013.01); *H01F 2017/046* (2013.01); *Y10T 29/49071* (2015.01)

(58) Field of Classification Search
CPC ........ H01F 27/29; H01F 27/292; H01F 27/32; H01F 3/12; H01F 41/10; H01F 2017/046
See application file for complete search history.

(56) References Cited

U.S. PATENT DOCUMENTS

| | | | | |
|---|---|---|---|---|
| 2,154,730 | A | 4/1939 | Cox | |
| 2,391,563 | A | 12/1945 | Goldberg | |
| 2,457,806 | A | 1/1949 | Crippa | |
| 2,568,169 | A | 9/1951 | Raczynski | |
| 2,850,707 | A | 9/1958 | Wroblewski | |
| 2,966,704 | A | 1/1961 | OBrian | |
| 3,201,729 | A | 8/1965 | Bianchi | |
| 3,235,675 | A | 2/1966 | Blume | |
| 3,255,512 | A | 6/1966 | Lochner | |
| 3,308,414 | A | 3/1967 | Ostrander | |
| 3,380,004 | A | 4/1968 | Hansen | |
| 3,554,797 | A | 1/1971 | Coerver | |
| 3,653,986 | A | 4/1972 | Pingel | |
| 3,678,345 | A | 7/1972 | Hvidtfeldt | |
| 3,750,069 | A | 7/1973 | Renskers | |
| 3,953,251 | A | 4/1976 | Butherus | |
| 4,146,854 | A | 3/1979 | Ishino | |
| 4,177,089 | A | 12/1979 | Bankson | |
| 4,498,067 | A | 2/1985 | Kumokawa | |
| 4,543,554 | A | 9/1985 | Muellenheim | |
| 4,601,753 | A | 7/1986 | Soileau | |
| 4,601,765 | A | 7/1986 | Soileau | |
| 4,696,100 | A | 9/1987 | Yamamoto | |
| 4,769,900 | A | 9/1988 | Morinaga | |
| 4,776,980 | A | 10/1988 | Ruffini | |
| 4,801,912 | A | 1/1989 | McElheny | |
| 5,023,578 | A | 6/1991 | Kaneko | |
| 5,034,710 | A | 7/1991 | Kawaguchi | |
| 5,160,447 | A | 11/1992 | Ishikawa | |
| 5,266,739 | A | 11/1993 | Yamauchi | |
| 5,291,173 | A | 3/1994 | Yerman | |
| 5,359,311 | A | 10/1994 | Kawabata | |
| 5,359,313 | A * | 10/1994 | Watanabe | H01F 3/14 336/178 |
| 5,381,124 | A | 1/1995 | Roshen | |
| 5,398,400 | A | 3/1995 | Breen | |
| 5,414,401 | A | 5/1995 | Roshen | |
| 5,446,428 | A | 8/1995 | Kumeji | |
| 5,495,213 | A | 2/1996 | Ikeda | |
| 5,551,146 | A | 9/1996 | Kawabata | |
| 5,665,289 | A | 9/1997 | Chung | |
| 5,680,087 | A | 10/1997 | Sakata | |
| 5,760,669 | A * | 6/1998 | Dangler | H01F 17/043 336/192 |
| 5,798,177 | A | 8/1998 | Jansson | |
| 5,867,891 | A | 2/1999 | Lampe | |
| 5,875,541 | A | 3/1999 | Kumeji | |
| 5,884,990 | A | 3/1999 | Burghartz | |
| 5,912,609 | A | 6/1999 | Usui | |
| 5,963,119 | A | 10/1999 | Takeda | |
| 6,063,209 | A | 5/2000 | Matsutani | |
| 6,154,112 | A | 11/2000 | Aoba | |
| 6,181,015 | B1 | 1/2001 | Gotoh | |
| 6,198,375 | B1 | 3/2001 | Shafer | |
| 6,204,744 | B1 | 3/2001 | Shafer | |
| 6,236,101 | B1 | 5/2001 | Erdeljac | |
| 6,284,617 | B1 | 9/2001 | Erdeljac | |
| 6,392,525 | B1 | 5/2002 | Kat | |
| 6,417,026 | B2 | 7/2002 | Gotoh | |
| 6,449,829 | B1 | 9/2002 | Shafer | |
| 6,460,244 | B1 | 10/2002 | Shafer | |
| 6,476,689 | B1 | 11/2002 | Uchida | |
| 6,515,566 | B1 | 2/2003 | Toi | |
| 6,555,035 | B2 | 4/2003 | Limura | |
| 6,572,830 | B1 | 6/2003 | Burdon | |
| 6,621,397 | B2 | 9/2003 | Hsu | |
| 6,650,218 | B1 * | 11/2003 | Fushimi | H01F 38/10 336/178 |
| 6,680,664 | B2 | 1/2004 | Fan | |
| 6,717,500 | B2 | 4/2004 | Girbachi | |
| 6,718,625 | B2 | 4/2004 | Ito | |
| 6,759,935 | B2 | 7/2004 | Moro | |
| 6,791,445 | B2 | 9/2004 | Shibata | |
| 6,825,746 | B2 | 11/2004 | Otsuka | |
| 6,827,557 | B2 | 12/2004 | Kim | |
| 6,864,774 | B2 | 3/2005 | Kanetaka | |
| 6,882,261 | B2 | 4/2005 | Moro | |
| 6,946,944 | B2 | 9/2005 | Shafer | |
| 7,001,659 | B2 | 2/2006 | Iriyama | |
| 7,034,645 | B2 | 4/2006 | Shafer | |
| 7,142,082 | B2 | 11/2006 | Kakehashi | |
| 7,142,084 | B2 | 11/2006 | Cheng | |
| 7,170,378 | B2 | 1/2007 | Fujiwara | |
| 7,176,778 | B1 | 2/2007 | Satake | |
| 7,183,886 | B2 | 2/2007 | Ooki | |
| 7,209,022 | B2 | 4/2007 | Kuroiwa | |
| 7,221,249 | B2 | 5/2007 | Shafer | |
| 7,230,514 | B2 | 6/2007 | Brunner | |
| 7,263,761 | B1 | 9/2007 | Shafer | |
| 7,277,001 | B2 | 10/2007 | Mizushima | |
| 7,281,315 | B2 | 10/2007 | Cheng | |
| 7,297,221 | B2 | 11/2007 | Hikita | |
| 7,310,871 | B2 | 12/2007 | Kuroiwa | |
| 7,318,905 | B2 | 1/2008 | Iriyama | |
| 7,345,562 | B2 | 3/2008 | Shafer | |
| 7,358,843 | B2 | 4/2008 | Takayama | |
| 7,373,715 | B2 | 5/2008 | Hirai | |
| 7,495,538 | B2 | 2/2009 | Tsunemi | |
| 7,609,140 | B2 | 10/2009 | Fukui | |
| 7,612,640 | B2 * | 11/2009 | Sano | H01F 27/255 336/83 |
| 7,655,348 | B2 | 2/2010 | Nanno | |
| 7,921,546 | B2 | 4/2011 | Shafer | |
| 7,986,207 | B2 | 7/2011 | Shafer | |
| 7,986,208 | B2 * | 7/2011 | Yan | H01F 27/292 336/192 |
| 8,075,710 | B2 | 12/2011 | Skarman | |
| 8,203,407 | B2 * | 6/2012 | Lin | H01F 27/292 336/83 |
| 8,471,668 | B2 | 6/2013 | Hsieh | |
| 9,318,251 | B2 | 4/2016 | Klesyk | |
| 10,319,507 | B2 | 6/2019 | Klesyk | |
| 2001/0001293 | A1 | 5/2001 | Gotoh | |
| 2001/0016977 | A1 | 8/2001 | Moro | |
| 2001/0019865 | A1 | 9/2001 | Erdeljac | |
| 2002/0124914 | A1 | 9/2002 | Kim | |

(56) References Cited

U.S. PATENT DOCUMENTS

| | | | |
|---|---|---|---|
| 2002/0158739 A1 | 10/2002 | Shibata | |
| 2002/0180038 A1 | 12/2002 | Oshima | |
| 2003/0141952 A1 | 7/2003 | Moro et al. | |
| 2004/0046626 A1* | 3/2004 | Nakata | H01F 17/043 336/83 |
| 2004/0140016 A1 | 7/2004 | Sakamoto | |
| 2004/0209120 A1 | 10/2004 | Inoue | |
| 2005/0057334 A1 | 3/2005 | Kitagawa | |
| 2005/0068149 A1* | 3/2005 | Fushimi | H01F 27/306 336/208 |
| 2005/0248426 A1* | 11/2005 | Lin | H01F 17/045 336/83 |
| 2006/0009000 A1 | 1/2006 | Shiu et al. | |
| 2006/0022788 A1 | 2/2006 | Toko | |
| 2007/0176595 A1 | 8/2007 | Fathauer | |
| 2007/0193022 A1 | 8/2007 | Yuden | |
| 2007/0262841 A1 | 11/2007 | Vishay | |
| 2007/0290161 A1 | 12/2007 | Tokuoka | |
| 2007/0294880 A1 | 12/2007 | Hsieh | |
| 2008/0003126 A1 | 1/2008 | Watanabe | |
| 2008/0012679 A1 | 1/2008 | Okabe | |
| 2008/0029300 A1 | 2/2008 | Harada | |
| 2008/0055034 A1 | 3/2008 | Tsunemi et al. | |
| 2008/0061264 A1 | 3/2008 | Maeda | |
| 2008/0110014 A1 | 5/2008 | Shafer | |
| 2008/0152897 A1 | 6/2008 | Maeda | |
| 2008/0231409 A1 | 9/2008 | Kugai | |
| 2008/0309443 A1 | 12/2008 | Furuya | |
| 2009/0045905 A1 | 2/2009 | Nakagawa | |
| 2009/0102589 A1 | 4/2009 | Lee et al. | |
| 2009/0184791 A1 | 7/2009 | Toko | |
| 2009/0250836 A1 | 10/2009 | Fukui | |
| 2010/0007455 A1 | 1/2010 | Shafer | |
| 2010/0039197 A1 | 2/2010 | Cheng | |
| 2010/0148902 A1 | 6/2010 | Shin et al. | |
| 2010/0194003 A1 | 8/2010 | Shimogawa | |
| 2010/0194511 A1 | 8/2010 | Kobayashi | |
| 2010/0253463 A1 | 10/2010 | Shimomura | |
| 2010/0289609 A1 | 11/2010 | Liao | |
| 2011/0005064 A1 | 1/2011 | Klesyk | |
| 2011/0006870 A1 | 1/2011 | Sakamoto | |
| 2011/0024670 A1 | 2/2011 | Otsuki | |
| 2011/0133881 A1 | 6/2011 | Nakajima | |
| 2011/0227690 A1 | 9/2011 | Watanabe | |
| 2011/0267167 A1 | 11/2011 | Ogawa | |
| 2011/0309906 A1 | 12/2011 | Muneuchi | |
| 2012/0038449 A1 | 2/2012 | Ogawa | |
| 2012/0070567 A1 | 3/2012 | Watanabe | |
| 2012/0086535 A1 | 4/2012 | Shafer | |
| 2012/0119871 A1 | 5/2012 | Ogawa | |
| 2012/0216392 A1 | 8/2012 | Fan | |
| 2012/0268232 A1 | 10/2012 | Yamada | |
| 2013/0033348 A1 | 2/2013 | Saito | |
| 2013/0106548 A1 | 5/2013 | Hsieh | |
| 2013/0106562 A1 | 5/2013 | Shafer | |
| 2013/0200972 A1 | 8/2013 | Wada | |
| 2014/0002227 A1 | 1/2014 | Hsieh | |
| 2014/0068926 A1 | 3/2014 | Saito | |
| 2016/0196914 A1 | 7/2016 | Klesyk | |

FOREIGN PATENT DOCUMENTS

| | | |
|---|---|---|
| CN | 101308719 | 11/2008 |
| CN | 101640100 A | 2/2010 |
| CN | 101790766 | 7/2010 |
| CN | 101927344 | 12/2010 |
| CN | 102938296 A | 2/2013 |
| DE | 364451 | 11/1922 |
| DE | 137019 | 3/1936 |
| DE | 1764087 | 4/1971 |
| DE | 2132378 | 1/1973 |
| DE | 2811227 | 9/1978 |
| DE | 4023141 | 1/1992 |
| EP | 0439389 | 7/1991 |
| EP | 0469609 | 2/1992 |
| FR | 2721431 | 12/1995 |
| GB | 2303494 | 2/1997 |
| JP | 55077113 | 6/1980 |
| JP | 56006652 | 1/1981 |
| JP | 57128014 | 8/1982 |
| JP | 58188108 | 11/1983 |
| JP | 59185809 | 12/1984 |
| JP | 60034008 | 2/1985 |
| JP | 62013005 | 1/1987 |
| JP | 63079306 | 4/1988 |
| JP | 63278317 | 11/1988 |
| JP | 01266705 | 10/1989 |
| JP | 01167011 U | 11/1989 |
| JP | 04115507 | 4/1992 |
| JP | 04129206 | 4/1992 |
| JP | 04196507 | 7/1992 |
| JP | 04206705 | 7/1992 |
| JP | 04286305 | 10/1992 |
| JP | 04373112 | 12/1992 |
| JP | H04346204 | 12/1992 |
| JP | 05283238 | 10/1993 |
| JP | H05291046 | 11/1993 |
| JP | 06061059 | 3/1994 |
| JP | 07201570 | 8/1995 |
| JP | 8031665 | 2/1996 |
| JP | H09074011 | 3/1997 |
| JP | 10326711 | 12/1998 |
| JP | 11195533 | 7/1999 |
| JP | 11195542 | 7/1999 |
| JP | 11224776 | 8/1999 |
| JP | 11339956 | 12/1999 |
| JP | 2000030925 | 1/2000 |
| JP | 2000036414 | 2/2000 |
| JP | 2000098975 | 4/2000 |
| JP | 2000150144 | 5/2000 |
| JP | 2000164352 | 6/2000 |
| JP | 2000331839 | 11/2000 |
| JP | 2001011563 | 1/2001 |
| JP | 2001118725 | 4/2001 |
| JP | 2001345225 | 12/2001 |
| JP | 2002151337 | 5/2002 |
| JP | 2002305108 | 10/2002 |
| JP | 2002313620 | 10/2002 |
| JP | 2002319520 | 10/2002 |
| JP | 2002343618 | 11/2002 |
| JP | 2004311560 | 11/2004 |
| JP | 2004336950 | 11/2004 |
| JP | 2006013054 | 1/2006 |
| JP | 200619673 A | 7/2006 |
| JP | 2007019134 | 1/2007 |
| JP | 2007027354 | 2/2007 |
| JP | 2007028838 | 2/2007 |
| JP | 2007123703 | 5/2007 |
| JP | 2007250934 | 9/2007 |
| JP | 2007258427 | 10/2007 |
| JP | 2007299871 | 11/2007 |
| JP | 2008028162 | 2/2008 |
| JP | 2008041961 | 2/2008 |
| JP | 2008195986 | 8/2008 |
| JP | 2008306017 | 12/2008 |
| JP | 2009056484 | 3/2009 |
| JP | 2009088496 | 4/2009 |
| JP | 2009088502 | 4/2009 |
| JP | 2009094428 A | 4/2009 |
| JP | 2009194364 | 8/2009 |
| JP | 2009260116 | 11/2009 |
| JP | 2009267350 | 11/2009 |
| JP | 2010147271 | 7/2010 |
| JP | 2010147272 | 7/2010 |
| KR | 100686711 | 2/2007 |
| KR | 20100101479 | 9/2010 |
| KR | 20100129025 | 12/2010 |
| KR | 20110100096 | 9/2011 |
| WO | 9205568 | 2/1992 |
| WO | 9602345 | 2/1996 |
| WO | 2007075061 | 7/2007 |

(56) References Cited

FOREIGN PATENT DOCUMENTS

| | | |
|---|---|---|
| WO | 2009128425 | 10/2009 |
| WO | 2010013843 | 2/2010 |

OTHER PUBLICATIONS

International Searching Authority, Patent Cooperation Treaty, International Search Report, dated Jul. 25, 2008, 5 pp.

International Searching Authority, Patent Cooperation Treaty, Written Opinion of the International Searching Authority, dated Jul. 25, 2008, 5 pp.

ISU Corporation, Low Profile Mobile Inductor, CMI-020-10 Series, 3 pp.

Maeda, T., et al., "Development of Super Low Iron-loss P/M Soft Magnetic Material," SEI Technical Review, No. 60, Jun. 2005, 4 pp.

TDK, SMD Inductors (Coils) For Power Line (Wound, Magnetic Shielded), LTF Series LTF5022, Aug. 29, 2006, 4 pp.

TDK, SMD Inductors (Coils) For Power Line (Wound, Magnetic Shielded), VLCF Series VLCF4018-2, Jun. 12, 2006, 1 p.

TDK, SMD Inductors (Coils) For Power Line (Wound, Magnetic Shielded), VLCF Series VLCF4020, Jun. 12, 2006, 1 p.

TDK, SMD Inductors (Coils) For Power Line (Wound, Magnetic Shielded), VLCF Series VLCF4028-2, Sep. 10, 2007, 1 p.

TDK, SMD Inductors (Coils) For Power Line (Wound, Magnetic Shielded), VLCF Series VLCF5020-1, Jul. 19, 2007, 1 p.

TDK, SMD Inductors (Coils) For Power Line (Wound, Magnetic Shielded), VLCF Series VLCF5020, Jul. 10, 2007, 1 p.

TDK, SMD Inductors (Coils) For Power Line (Wound, Magnetic Shielded), VLCF Series VLCF5028-2, Sep. 10, 2007, 1 p.

TDK, SMD Inductors (Coils) For Power Line (Wound, Magnetic Shielded), VLF Series Vlf 4012S, Sep. 11, 2007, 2 pp.

TDK, SMD Inductors (Coils) For Power Line (Wound, Magnetic Shielded), VLF Series VLF3010S, Sep. 30, 2007, 2 pp.

TDK, SMD Inductors (Coils) For Power Line (Wound, Magnetic Shielded), VLF Series VLF3014S, Sep. 11, 2007, 1 p.

TDK, SMD Inductors (Coils) For Power Line (Wound, Magnetic Shielded), VLF Series VLF4012A-2, Sep. 27, 2006, 2 pp.

TDK, SMD Inductors (Coils) For Power Line (Wound, Magnetic Shielded), VLF Series VLF4014S, Sep. 30, 2007, 2 pp.

TDK, SMD Inductors (Coils) For Power Line (Wound, Magnetic Shielded), VLF Series VLF5010S, Sep. 30, 2007, 2 pp.

TDK, SMD Inductors (Coils) For Power Line (Wound, Magnetic Shielded), VLF Series VLF5012S, Sep. 30, 2007, 2 pp.

TDK, SMD Inductors (Coils) For Power Line (Wound, Magnetic Shielded), VLF Series VLF5014S, Sep. 30, 2007, 2 pp.

TDK, SMD Inductors (Coils) For Power Line (Wound, Magnetic Shielded), VLS Series VLS252012, Sep. 11, 2007, 2 pp.

TDK, SMD Inductors (Coils) For Power Line (Wound, Magnetic Shielded), VLS Series VLS252015, Sep. 11, 2007, 2 pp.

TDK, SMD Inductors (Coils) For Power Line (Wound, Magnetic Shielded), VLS Series VLS3015, Sep. 11, 2007, 2 pp.

TDK, SMD Inductors (Coils) For Power Line (Wound, Magnetic Shielded), VLS Series, VLS4012, Sep. 11, 2007, 2 pp.

The Patent Reexamination Board of the State Intellectual Property Office of the People's Republic of China, Decision of Examination Upon Request for Invalidation, dated Aug. 1, 2014, 20 pp.

The Patent Reexamination Board of the State Intellectual Property Office of the People's Republic of China, Invalidation Request, dated Feb. 10, 2014, 78 pp.

Toko, Fixed Inductors for Digital Audio Amplifier, EAW30S, Part No. 1107EH-0001, 1 p.

Vishay, Low Profile, High Current Inductor, IHLP-2525CZ-01, Aug. 10, 06, 4 pp.

Vishay, Molded, Low Profile, High Current Inductor, IHLM-2525CZ-01, Jan. 24, 2006, 4 pp.

* cited by examiner

ELECTRONIC COMPONENT

CROSS-REFERENCE TO RELATED APPLICATIONS

This application is a continuation of prior U.S. application Ser. No. 15/067,375, filed Mar. 11, 2016, now U.S. Pat. No. 10,319,507, issued Jun. 11, 2019, which is a continuation of prior U.S. application Ser. No. 12/885,045, filed Sep. 17, 2010, now U.S. Pat. No. 9,318,251, issued Apr. 19, 2016, which is a continuation of prior U.S. application Ser. No. 11/836,043, filed Aug. 8, 2007, and claims the benefit of U.S. Provisional Application No. 60/821,911, filed Aug. 9, 2006, which are incorporated herein by reference in their entirety.

FIELD OF THE INVENTION

This invention relates generally to electronic components and more particularly concerns magnetics, such as surface mountable inductive components, having a structure and composition that improves the manufacturability and performance of the component and methods relating to same.

BACKGROUND

The electronics industry is continually called upon to make products smaller and more powerful. Applications such as mobile phones, portable computers, computer accessories, hand-held electronics, etc., create a large demand for smaller electrical components. These applications further drive technology and promote the research of new areas and ideas with respect to miniaturizing electronics. The technology is often limited due to the inability to make certain components smaller, faster, and more powerful. In addition, manufacturing concerns can make the cost of production exceedingly expensive. For example, the use of complicated processes, a large number of steps, and/or a number of different machines or parts quickly drives up the cost of manufacturing electronic components.

Magnetic components, such as inductors, are good examples of the type of components that have been forced to become smaller and/or more powerful. Typical inductors include shielded and non-shielded components. Non-shielded components are often used in low current applications and comprise a wire wound about a core of magnetic material, such as ferrite, with the ends of the wire connected to respective terminals for mounting the component into an electronic circuit of some type, usually on a printed circuit board. Due in part to the difficulty in metalizing the core itself, the core of these components is usually nested in a body of ceramic or plastic material to which the terminals are connected.

Shielded components are often preferred due to the efficiency with which they allow the inductive component to operate and due to the minimal interference, they have on the remainder of the circuit, regardless of whether it is a low or high current application. Shielded components often comprise a wire wound into a coil with the ends of the wire connected to respective terminals for mounting the component into a circuit, much like non-shielded components. Shielded components, however, typically include a shielding body encasing all or a large portion of the coil winding so that the inductor is able to operate more efficiently and generates only minimal electromagnetic interference.

For example, some inductive components use a cover made of either a magnetic or non-magnetic material in order to reduce the amount of gaps and close the flux paths associated therewith so that the component operates more efficiently and better inductance characteristics can be reached. Examples of such structures can be seen in U.S. Pat. No. 3,750,069 issued to Renskers on Jul. 31, 1973, U.S. Pat. No. 4,498,067 issued to Kumokawa et al. on Feb. 5, 1985, U.S. Pat. No. 4,769,900 issued to Morinaga et al. on Sep. 13, 1988, and U.S. Pat. No. 6,717,500 issued to Girbachi et al on Apr. 6, 2004. Although these patents illustrate such covers for use with specific windings and core shapes, it should be understood that such concepts may apply to other windings and core shapes, as desired.

A shortcoming of such structures, however, is that the shielding accomplished by the cover often takes up additional space and allows for unnecessary air gaps to exist in the component. This shortcoming has been addressed by embedding the coil in magnetic and/or non-magnetic materials for shielding purposes. The embedded coil may either be potted and cured such as in U.S. Pat. No. 3,255,512 issued to Lochner et al. on Jun. 14, 1966, or compression molded and cured such as in U.S. Pat. No. 3,235,675 issued to Blume on Feb. 15, 1966, U.S. Pat. No. 4,696,100 issued to Yamamoto et al. on Sep. 29, 1987, U.S. Pat. No. 6,204,744 issued to Shafer et al. on Mar. 20, 2001 and U.S. Pat. No. 6,759,935 issued to Moro et al. on Jul. 6, 2004.

Typically, the cured components include a wire embedded in a magnetic and/or non-magnetic mixture which contains a binder such as epoxy resin, nylon, polystyrene, wax, shellac, varnish, polyethylene, lacquer, silicon or glass ceramic, or the like, in order to hold the mixture together. Magnetic materials, such as ferrite or powder iron mixtures, and/or non-magnetic material, such as other metals and powdered metal mixtures, may be used in combination with the binder to form the mixture used to embed the coil winding. The mixture is then potted and cured to form a hardened inductor capable of being inserted into a circuit via conventional pick-and-place machinery.

One type of compression molded component includes a wire embedded in a similar magnetic and/or non-magnetic mixture, however, the mixture typically contains a plastic or polymer binder which is capable of withstanding the high temperatures at which the molded structure (or the green body) will be baked or sintered. Compression molding is often preferred over curing in that it allows for a more densely populated mixture with minimal gaps between molecules, which in turn can improve the inductance characteristics of the component and reduce flux losses. However, since compression molding is often several times more expensive than potting and curing with a binder such as epoxy, potted and cured components are typically pursued in applications for which they are capable of meeting the desired operational parameters.

Another factor that weighs in heavily as to whether curing or compression molding is used and as to what type of mixture is used, (e.g., magnetic and/or non-magnetic), is whether the component is meant for high current, low inductance applications or for low current, high inductance applications. In high current, low inductance applications, compression molding is often used due to its ability to densely pack the shielding material around the coil winding. In such applications, the mixture is typically made of a non-ferrite powdered iron magnetic and/or non-magnetic material in combination with a polymer binder, such as resin. The powdered iron material used in such applications has a larger saturation magnetic flux density and a relatively low permeability as compared to ferrite. A flat winding of wire is also typically used in place of a round wire due to its ability to handle higher current without adding the size associated with a larger gauge, round wire. One shortcoming with existing high current, low inductance applications, however, is that the number of windings cannot be increased without the footprint of the component also increasing. This is due to the fact conventional components only wind the flat conductors used for the wire coil in a single row of wire. Thus, as the number of windings are increased, so too must the footprint of the component be increased.

Another shortcoming with conventional high current, low inductance applications is that components with the same general structure cannot be used to form low current, high inductance applications due to the negative attributes associated with non-ferrite magnetic and/or non-magnetic mixtures. For example, components made of lossy materials such as powdered iron without ferrite often have poor direct current resistance ("DCR") and lower Q values when used in low current, high inductance applications which can hinder the performance and efficiency of the component. Thus, the lack of a ferromagnetic material such as ferrite can leave the component incapable of reaching the inductance levels that may be required for certain low current, high inductance applications.

Yet another shortcoming with conventional components is that they either require the wire to be pre-wound and then removed from the object it is wound upon (which is often difficult to accomplish) and inserted into a mold to be encased in the magnetic and/or non-magnetic mixture via potting or compression molding, or they require multiple steps to produce the end component, such as by requiring the use of multiple dies to form the component.

Accordingly, it has been determined that the need exists for an improved inductive component and method for manufacturing the same which overcomes the aforementioned limitations and which further provide capabilities, features and functions, not available in current devices and methods for manufacturing.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, an electronic component comprises a core having a wire wound around a portion of the core and having an outer body that is either potted or over-molded about a portion of the core and wire. In one preferred form, a tack core made of a magnetic material is wound with insulated wire and over-molded with a mixture of magnetic and/or non-magnetic material that is compression molded over the component. In another preferred form, a tack core made of magnetic material is wound with insulated wire and potted with a mixture of magnetic and/or non-magnetic material that is cured over the component. The components further include terminals connected to the ends of the wire for connecting the component into a circuit. In the embodiments illustrated, the electronic components are configured in a surface mount package for mounting on a printed circuit board (PCB).

Figure 1:
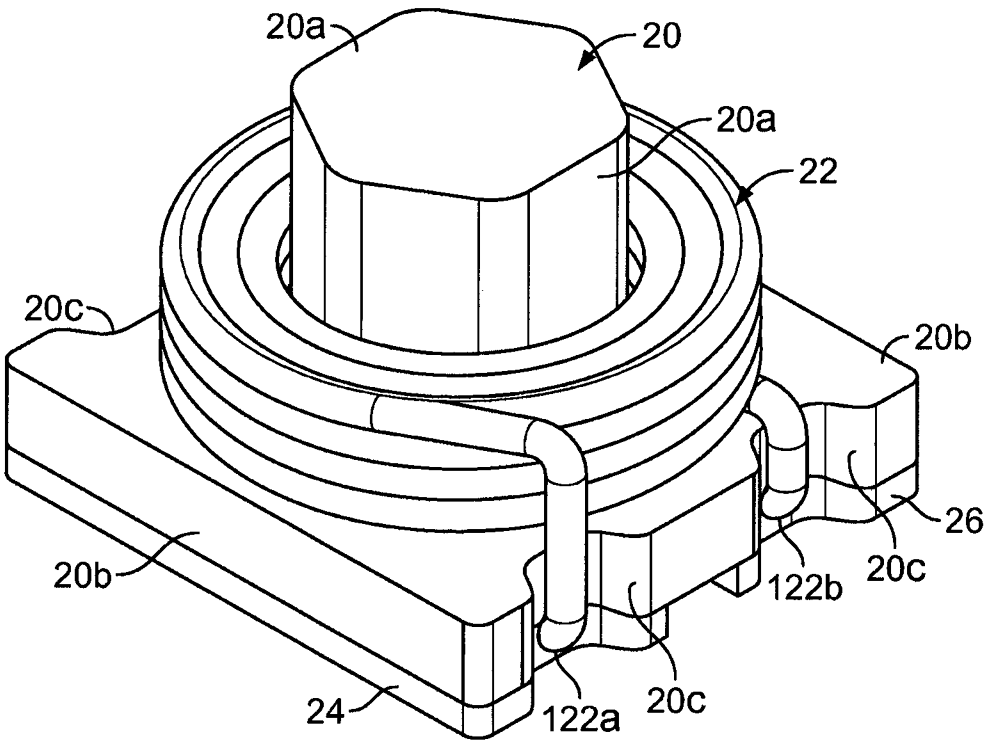
FIG. 1 is a perspective view of a partially assembled electronic component in accordance with the invention, showing the component from above.
Figure 2:
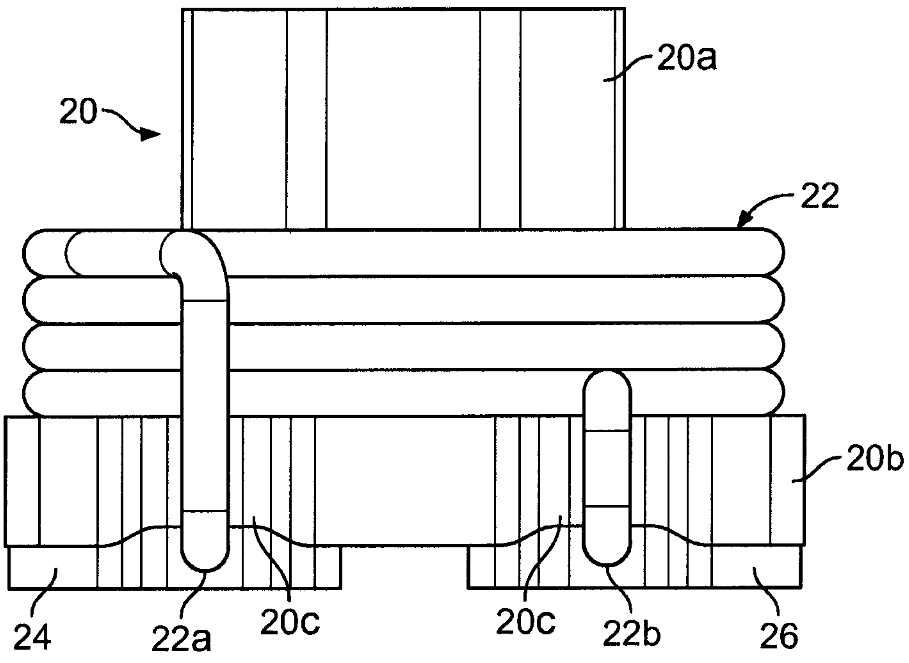
FIG. 2 is a side elevational view of the partially assembled electronic component of FIG. 1.
Figure 3:
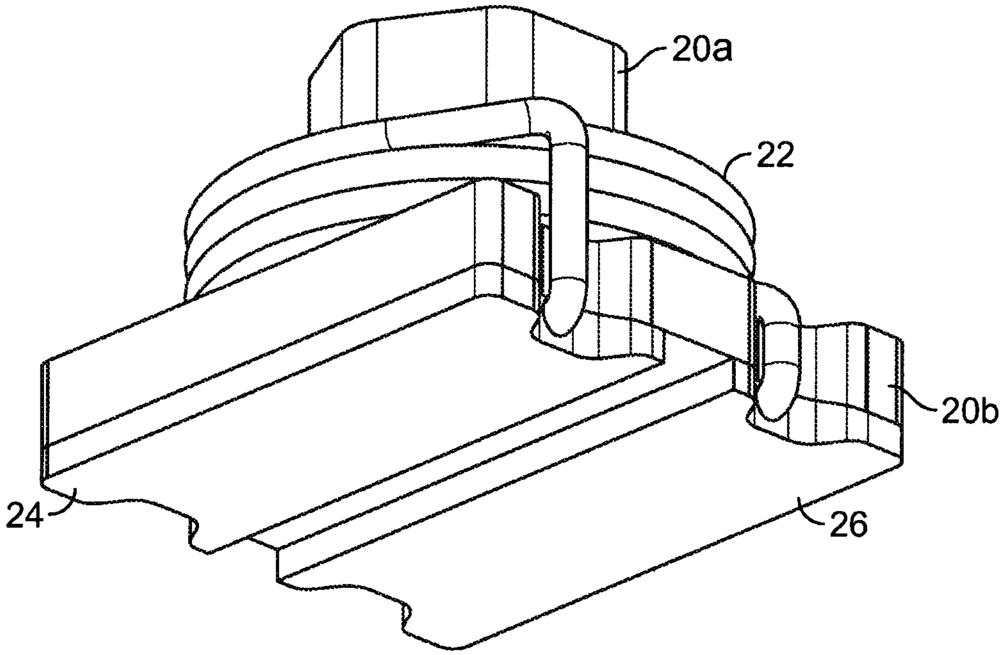
FIG. 3 is another perspective view of the partially assembled electronic component of FIG. 1, showing the component from below.
Figure 4:
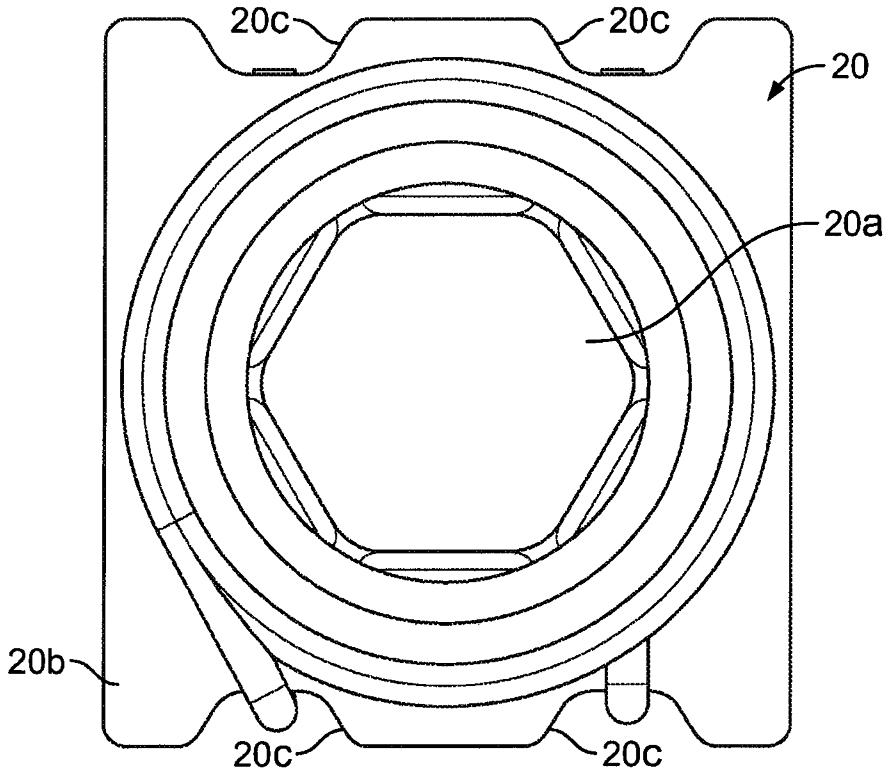
FIG. 4 is a top plan view of the partially assembled electronic component of FIG. 1.
Figure 5:
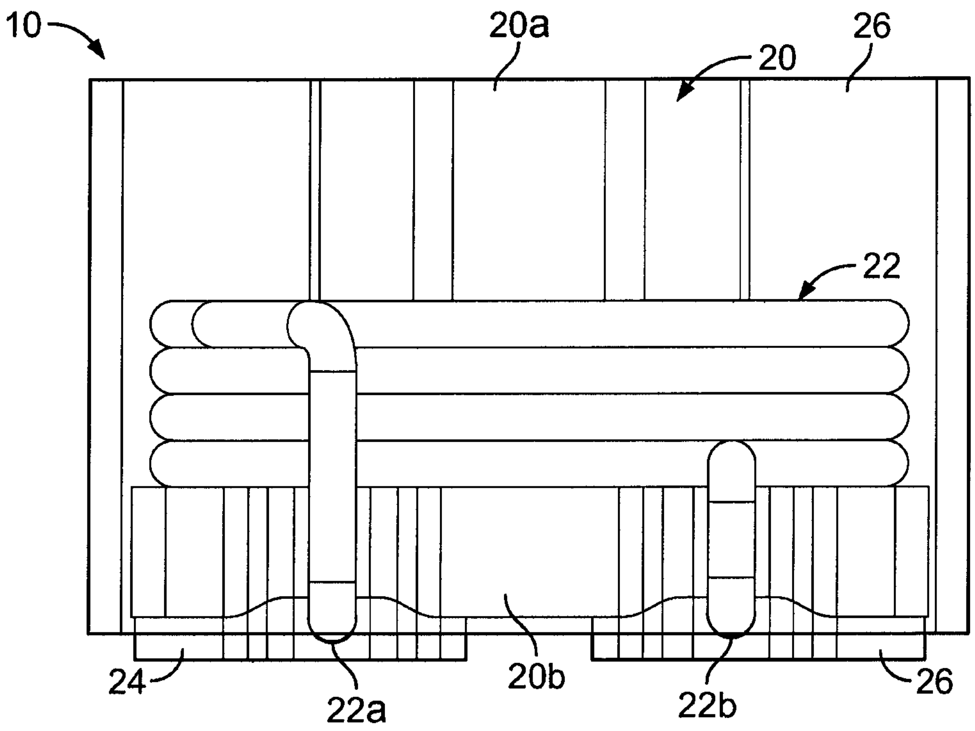
FIG. 5 is a side elevational view of the electronic component of FIG. 1 fully assembled, the outer body of the component being transparent for illustrative purposes only and showing an upper portion of the component which can be removed in order to reduce the size of the component.
Figure 6:
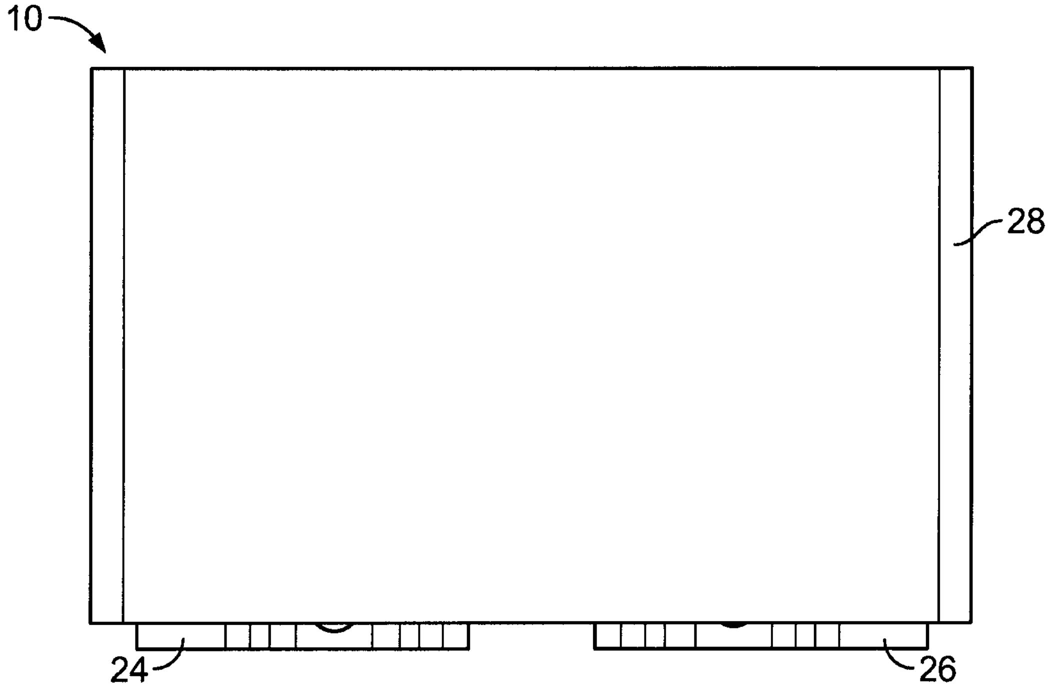
FIG. 6 is a side elevational view of the electronic component of FIG. 1, the outer body of the component being shown in its normal opaque condition.
Figure 7:
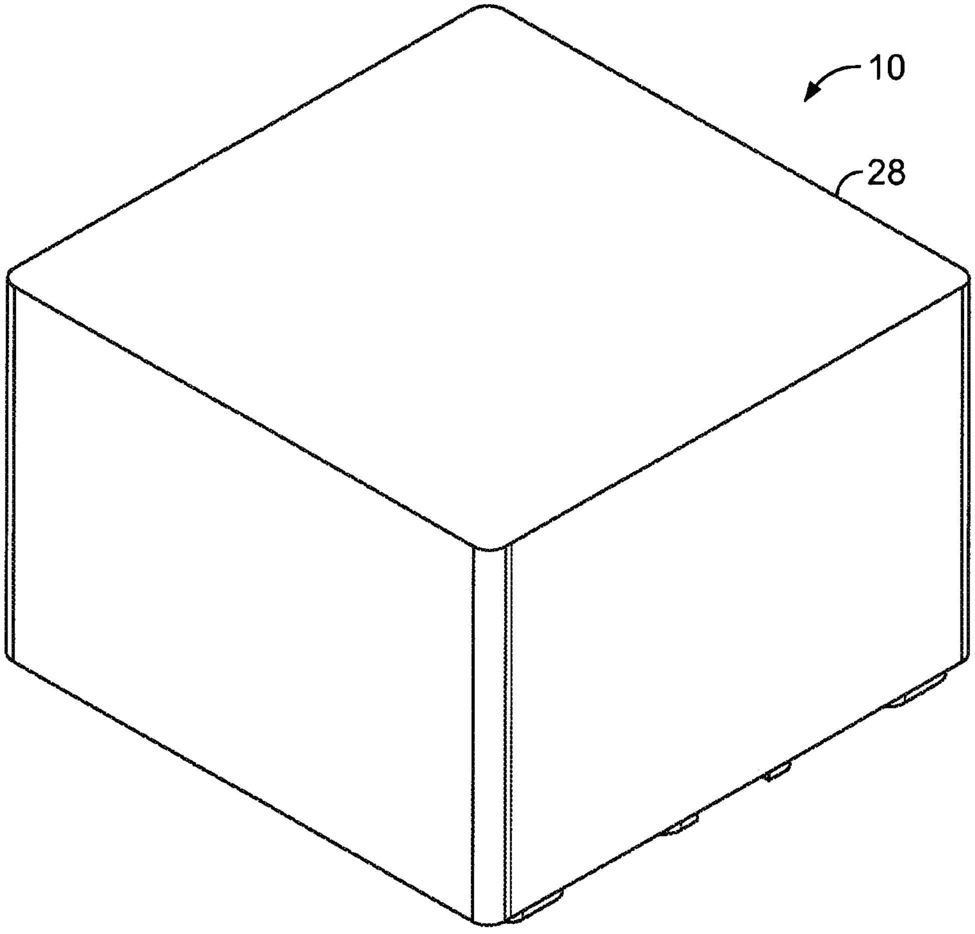
FIG. 7 is a perspective view of the electronic component of FIG. 1, showing the component from above and the outer body of the component in its normal opaque condition.
Figure 8:
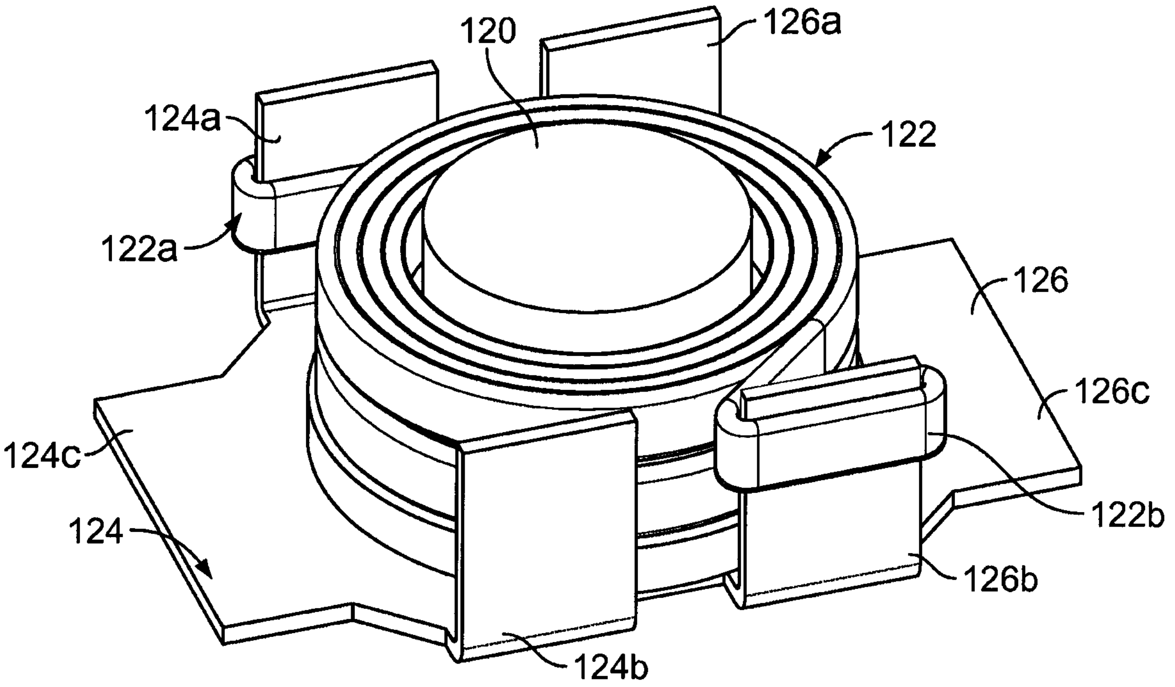
FIG. 8 is a perspective view of another partially assembled electronic component in accordance with the invention, showing the component from above.
Figure 9:
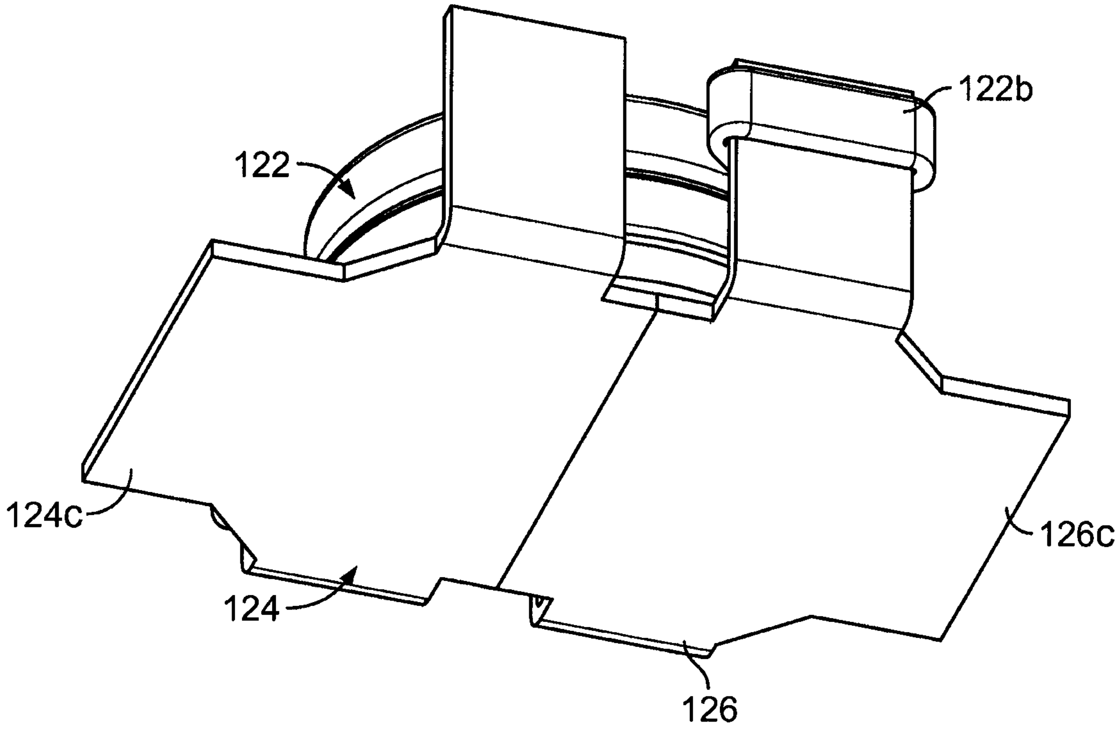
FIG. 9 is another perspective view of the partially assembled electronic component of FIG. 8, showing the component from below.
Figure 10:
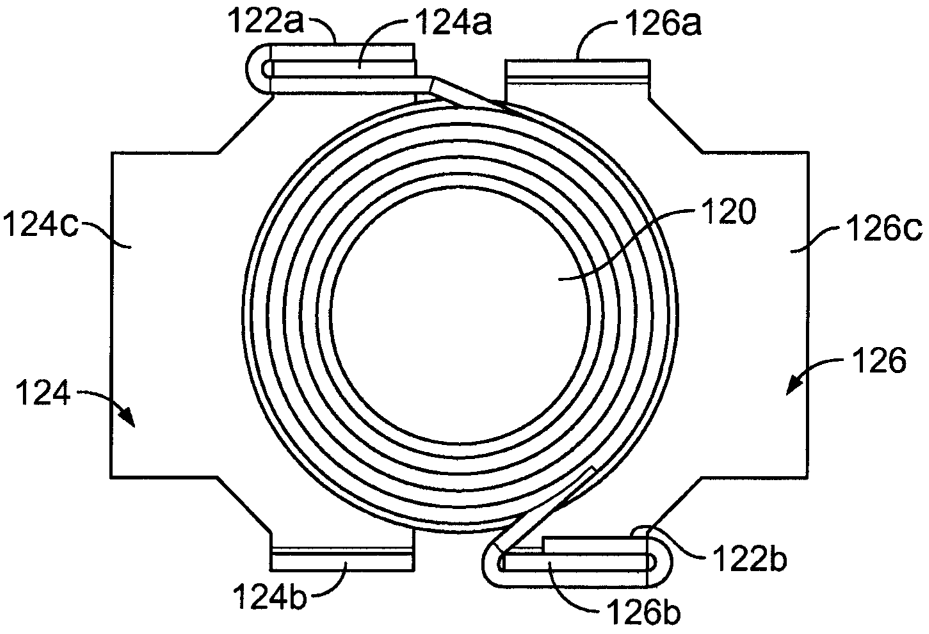
FIG. 10 is a top plan view of the partially assembled electronic component of FIG. 8.

Referring now to the drawings, and in particular to FIG. 1, a portion of the electronic component 10 is illustrated having a tack core 20, a conductive element 22, and terminals 24 and 26. The tack core 20 preferably comprises a soft ferrite material, although a number of other conventional core materials may be used. The terminals 24 and 26 are preferably metalized pads made by applying a heat-curable thick film to opposite ends of the tack core 20. The terminals 24 and 26 may be used to electrically and mechanically connect the component 10 to the PCB. The component 10 further includes an outer body 28 disposed about at least a portion of the core 20 and conductive element 22 as shown in FIGS. 5-7.

In the embodiment shown, the tack core 20 includes a column or post 20*a* and a base or flanged portion 20*b*. The post 20*a* is generally centrally located with respect to the flanged portion 20*b* and extends from an upper surface thereof. The post 20*a* preferably has a hexagonal cross-section, as shown, although other cross-sections are contemplated, such as for example a generally circular cross-section or, alternatively, other polygonal shaped cross-sections. The flat surfaces of the hexagonal cross-section illustrated allows the post 20*a* to be gripped and held more easily when assembling the component 10 via automated processes.

The flanged portion 20*b* shown in FIG. 1 has a somewhat square cross section, however circular or hexagonal cross sections are also contemplated. The thickness of the flanged portion 20*b* creates a flange edge which is located between the upper and lower surfaces of flange 20*b*. The flange 20*b* and flange edge include several recesses 20*c* which allow the first and second wired ends, 22*a* and 22*b* respectively, to be wrapped around the flange edge and connected to terminals 24 and 26 under the bottom surface of flange 20*b* without increasing the width of the overall component 10. In essence, the recesses 20*c* provide access or form vias to the terminals 24 and 26 for wire 22.

The recesses 20*c* are preferably positioned in pairs on opposite sides of the flange 20*b* so that the flange 20*b* takes on a symmetrical shape with one pair of recesses 20*c* providing access to terminal 24 and another pair of recesses 20*c* providing access to terminal 26. The symmetry of the flange 20*b* allows the orientation of the core 20 to have minimal impact on the assembly of the component 10 and, more particularly, allows for the core 20 to be wound more easily and efficiently as the wire ends 22*a-b* can be extended through whichever recess 20*c* associated with a desired terminal is closest to the wire 22 when the wire has ceased being wound about the core post 20*a*.

In a preferred embodiment, the post 20*a* and flange 20*b* are integral with one another and are formed during the processing of the ferrite. In the form illustrated, the tack core 20 is shaped into a green body and then subsequently fired or sintered in a furnace or kiln. The relative ease of shaping a ferrite green body allows the tack core 20 to be made in a variety of shapes and sizes depending on the application. Further, by making the tack core 20 of a low loss soft magnetic material like ferrite, the electronic component 10 produces a relatively low DCR which allows the component to work better and more efficiently in low current, high inductance applications. In addition, the ferrite tack core 20 can be metalized, thereby presenting less of a problem with forming terminals after the outer body 28 has encased the core 20 and winding 22. More particularly, metalizing the tack core 20 eliminates the need for a separately attached lead frame or terminal electrode and, thus, removes the manufacturing steps required to connect the terminals or electrodes thereby simplifying the manufacturing process. For example, attaching, welding, bonding, and cutting steps are no longer necessary. These types of ferrite cores are readily available in the marketplace from a number of suppliers.

In yet other embodiments, cores having a variety of different shapes and sizes may be used. For example, a rod type core may be used in one embodiment and a drum or bobbin type core may be used in another embodiment. In still other embodiments, a torroid or other conventional core shape may be used. Further, the size of the core may be varied in order to customize the component for specific applications, as will be discussed further below.

As shown in the preferred embodiment illustrated in FIGS. 1-5, the conductive element 22 is an insulated wire having a circular cross section, however, conductors of other cross sectional shapes are contemplated, such as for example flat wire as will be discussed further below with respect to an alternate embodiment. The wire is preferably selected from wire gauges ranging between twenty-eight and forty-two gauge wire, however, other gauges outside this range may also be used. In practice, the specific application and height of the component will often factor into what wire gauge is selected. The customization process, as discussed below, includes choosing the wire gauge relative to the chosen component application.

As mentioned above, the wire 22 is wound around a portion of the post 20*a* and has its ends, 22*a-b*, bent over the edge of flange 20*b* within recesses 20*c* and connected to respective terminals 24 and 26. By feeding the wire 22 through the recesses 20*c*, the wire 22 is allowed to be fed from the post 20*a* to the terminals 45 and 46 below flange 20*b* without increasing the footprint of the component 10 because the wire does not extend beyond the outermost edge of the flange 20*b*. This helps keep the footprint of the component small so that it can be used in more applications, including those that call for miniature inductors.

The first and second ends 22*a-b* of wire 22 are preferably embedded in the metalizing thick film forming terminals 24 and 26 so that a strong electrical connection will be made between the component 10 and the PCB when the component 10 is soldered to the PCB via conventional soldering techniques. In alternate embodiments, however, the wire ends 22*a-b* may be connected to the terminals 24 and 26 using other conventional methods, such as by staking or welding them to the terminals 24 and 26.

To further reduce any impact the wire 22 has on the height of the component 10, the wire ends 22*a-b* may be flattened to minimize the height they add to the component. In alternate embodiments, the bottom surfaces of the flanged end 20*b* of core 20 may define recesses for receiving the wire ends so that no height is added to the component 10 by bending the wires under the lower surface of the flange 20*b*. In the embodiment illustrated, the terminals 24 and 26 take on the same outer shape as the flange 20*b*, thus, recesses 24*a* and 26*a* are formed in the edge of the terminals 24 and 26 corresponding to the recesses 20*c* of core 20. The location of the wire ends 22*a-b* and the corresponding recesses 20*c*, 24*a* and 26*a* result in the ends of the wire 42*a-b* and terminals 24 and 26 being at least partially embedded in the over-molded outer body 28.

The metalized pads 24 and 26 are preferably made of a heat-curable thick film, such as silver paste thick film. It should be understood, however, that other conventional materials may be used to form the terminals 24 and 26 in place of the illustrated silver thick film, such as for example other precious metals or electrically conductive materials. In the embodiment illustrated, the silver thick film terminals 24 and 26 are applied by a screen printing process. In addition to a screen printing process, however, the metalized pads 24 and 26 could be applied by spraying, sputtering or various other conventional application methods that result in a metalized surface.

Since the ferrite tack core 20 can itself be metalized, the assembly of the component need not require additional steps for attaching terminals to the component, such as by attaching clip type terminals to the outer body 28 or insulating the outer body 28 so that such terminals can be connected thereto. It should be understood, however, that in alternate embodiments, the component 10 may be provided with other types of terminals, such as conventional clip type terminals connected to either the outer body 28 or the flanged end 20*b* of core 20, if desired. Thus, the component 10 not only can be used for low current, high inductance applications, but also can reduce the amount of steps required to produce such an electrical component.

Together the tack core 20, the conductive element 22, and the thick film terminals 24 and 26 comprise an assembly. Once assembled, the assembly is encased or embedded in the outer body 28. In FIGS. 5-7, the outer body 28 comprises a mixture of magnetic and/or non-magnetic powder that can be either potted and cured or compression molded. For example, in one embodiment, the mixture that makes up outer body 28 includes a powdered iron, such as Carbonyl Iron powder, and a polymer binder, such as a plastic solution, which are compression molded over the core 20 and winding 22. In a preferred form, the ratio of powdered iron to binder is about 10% to 98% powdered iron to about 2% to 90% binder, by weight. In the embodiment illustrated, the ratio of powdered iron to binder will be about 80% to 92% Carbonyl Iron powder to about 8% to 20% polymer resin, by weight.

It is possible and even desirable in some low current, high inductance applications for the molded mixture to further include powdered ferrite and, depending on the application, the powdered ferrite may actually replace the powdered iron in its entirety. For example, a ferrite powder with a higher permeability may be added to the mixture to further improve the performance of the component 10. The above ratios of powdered iron are also applicable when a combination of ferrite and powdered iron is used in the mixture and when powdered ferrite is used alone in the mixture. In yet other embodiments, other types of powdered metals may be used in addition to or in place of those materials discussed above.

After compression molding the mixture, the mold may be removed from the molding machine and the component may be ground to the desired size (if needed). The component 10 is then removed from the mold and stored in conventional tape and reel packaging for use with existing pick-and-place machines in industry. A lubricant such as Teflon or zinc stearate may also be used in connection with the mold in order to make it easier to remove the component 10, if desired.

Alternatively, the component 10 may be made by potting and curing the mixture that makes up the outer body 28, rather than compression molding the component. The main advantages to potting and curing are that the component can be manufactured quicker and cheaper than the above-described compression molding process will allow. In this embodiment, the mixture that makes up outer body 28 may similarly be made of magnetic and/or non-magnetic material and will preferably include a powdered iron, such as Carbonyl Iron powder, and a binder, such as epoxy, which is potted and cured over the core 20 and winding 22. In this embodiment, the ratio of powdered iron to binder is about 10% to 98% powdered iron to 2% to 90% binder, by weight, with a preferred ratio of powdered iron to binder being about 70% to 90% Carbonyl Iron powder to about 10% to 30% epoxy, by weight. As with the compression molded component, the potted component may alternatively use powdered ferrite or a mixture of powdered ferrite and another powdered iron.

In this configuration, the assembled core 20, winding 22 and terminals 24 and 26 will preferably be inserted into a recess that contains the mixture making up the outer body 28 and an adhesive such as glue. The mixture and assembly is then cured to produce a finished component. As with the first embodiment discussed above, the cured component may also be ground to a specific size (if desired) and then packaged into convention tape and reel packaging for use with existing pick-and-place equipment.

Regardless of whether the component is potted and cured or compression molded, the ratio of binder (e.g., epoxy, resin, etc.) to magnetic and/or non-magnetic material (e.g., powdered iron, powdered ferrite, etc.) impacts the inductance and current handling capabilities of the electronic component 10. For example, increasing the amount of epoxy or resin and lowering the amount of powdered iron produces a component 10 capable of handling higher current but having lower inductance capabilities. Therefore, changing the ratio of the substances relative to one another produces different components with different capabilities and weaknesses. Such options allow the component 10 to be customized for specific applications. More particularly, customizing the electronic component 10 allows the component to be precisely tailored to the particular chosen application. Different applications have different requirements such as component size, inductance capabilities, current capacity, limits on cost, etc. Customization can include choosing a wire gauge and length relative to the amount of current and/or inductance required for the application. For example, higher inductance applications may require an increased number of coil turns, and/or a wire with a relatively large cross-sectional area (i.e., gauge).

In addition, customization can include selecting the material that comprises the core 20, along with the dimensions, and structural specifications for the core 20. For example, a ferrite with higher permeability or higher dielectric constants may be chosen to increase inductance. By varying the ratio of elements that comprise the ferrite the grade of the ferrite changes and different grades are suited for different applications. Further, the thickness of the post 20*a* and/or flange 20*b* may change the inductance characteristics of the component 10. The size of the ferrite post or flange also may be limited by the current requirements, as ferrite can have significant losses in higher current applications.

While many of these variables can increase inductance many of them can also create constraints on other variables. For example, increasing the number of turns of wire 22 may limit the size of the core 20 that can be used if a specific component height must be reached. Therefore, application requirements and material limitations must be considered when choosing the core material and other specifications.

In addition to choosing the tack core 20, the components of the mixture that makes up outer body 28 must also be selected. The mixture typically includes a powder metal iron such as ferrite or Carbonyl Iron powder and either resin or epoxy. The application and manufacturing constraints determine which components to include in the mixture 44. In low current, high inductance applications, it may be more desirable to increase the percentage of ferrite used in the mixture making up body 28. Conversely, in high current, low inductance applications, it may be more desirable to limit the percentage of ferrite (if any) used in the mixture making up body 28. For example, an alternate embodiment of a high current, low inductance component is illustrated in FIGS. 8-15. For convenience, items which are similar to those discussed above with respect to component 10 will be identified using the same two digit reference numeral in combination with the prefix “1” merely to distinguish one embodiment from the other. Thus, the conductor used in component 110 is identified using the reference numeral 122 since it is similar to wire 22 discussed above. In the embodiment illustrated in FIGS. 8-10, a partially assembled version of component 110 is illustrated having a tack core 120, a conductive element 122 and terminals 124 and 126. Unlike component 10 discussed above, the conductive element 122 of component 110 is a flat wire, rather than a round wire, and the terminals 124 and 126 are separate metal plates, rather than metalizing thick film. The component 110 further includes an outer body 128 of magnetic and/or non-magnetic material disposed about at least a portion of the core 120 and wire winding 122 as shown in FIGS. 11-15.

In a preferred embodiment, the tack core 120 has a similar shape to tack core 20 discussed above, however, the core 120 will be made up of a higher concentration of non-ferrite material. In fact, in some instances no ferrite material may be used at all and the core 120 will include other magnetic and/or non-magnetic materials, such as powdered irons like Carbonyl Iron. For some applications, the core 120 will be made of the same material used to form the outer body 128.

As with component 10, the wire 122 of component 110 is wound about central post 120*a* of core 120 and upon the upper surface of flange 120*b*. Unlike other flat wire components, however, component 110 includes at least a second row of flat wire windings. This allows a larger wire to be used and/or the number of windings to be increased without increasing the size of the footprint of component 110. The second row of windings is achieved by making a slight bend in the wire 122 which allows the wire 122 to transition from the first row of windings to a second row. Additional bends and rows may be added as desired; however, as each additional row increases the height of the coil 122, other changes to component 110 may need to be made in order to reach a desired height. For example, the thickness of flange 120*b* or diameter of post 120*a* may have to be adjusted or reduced in order to meet a desired height for component 110. The core 120 and outer body 128 may also be ground down as discussed above with respect to component 10 in order to reach the desired height. In a preferred method of manufacturing component 110, the bends in wire 122 are made prior to winding the component. However, in alternate processes, the bend in wire 122 may be made while the wire 122 is being wound on the core 120.

Figure 11:
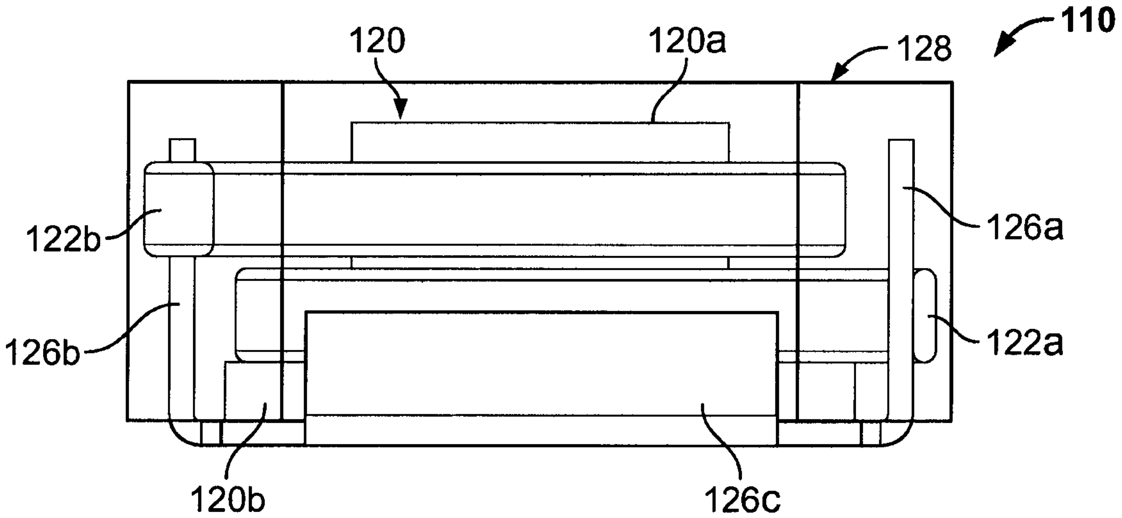
FIG. 11 is a side elevational view of the electronic component of FIG. 8 fully assembled, the outer body of the component being transparent for illustrative purposes only.
Figure 12:
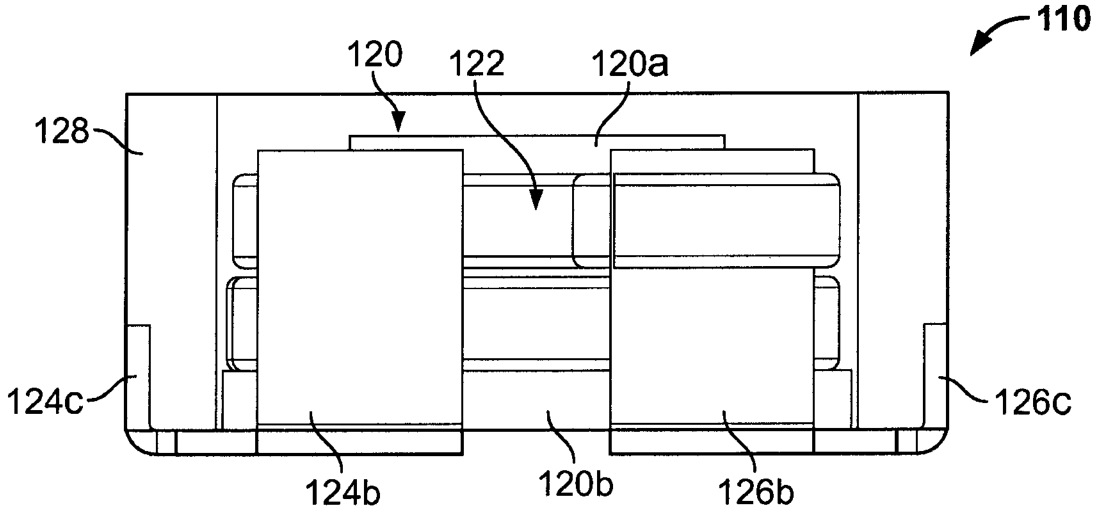
FIG. 12 is another side elevational view of the electronic component of FIG. 8 fully assembled, the outer body of the component being transparent for illustrative purposes only.
Figure 13:
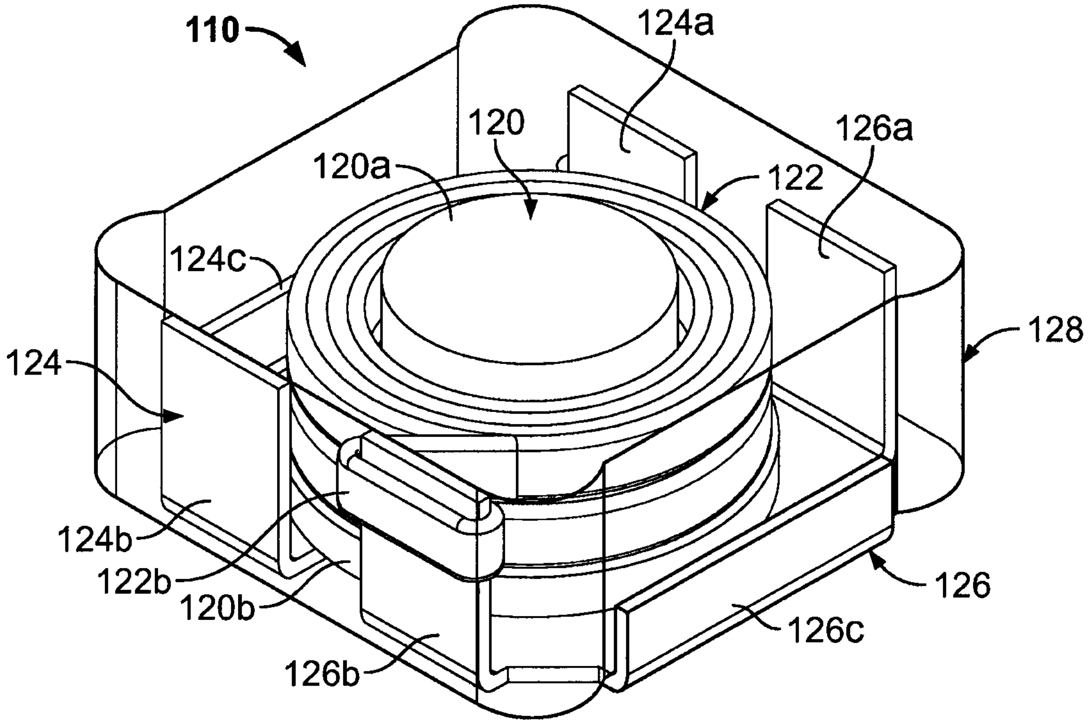
FIG. 13 is a perspective view of the electronic component of FIG. 8 fully assembled, showing the component from above with the outer body of the component being transparent for illustrative purposes only.
Figure 14:
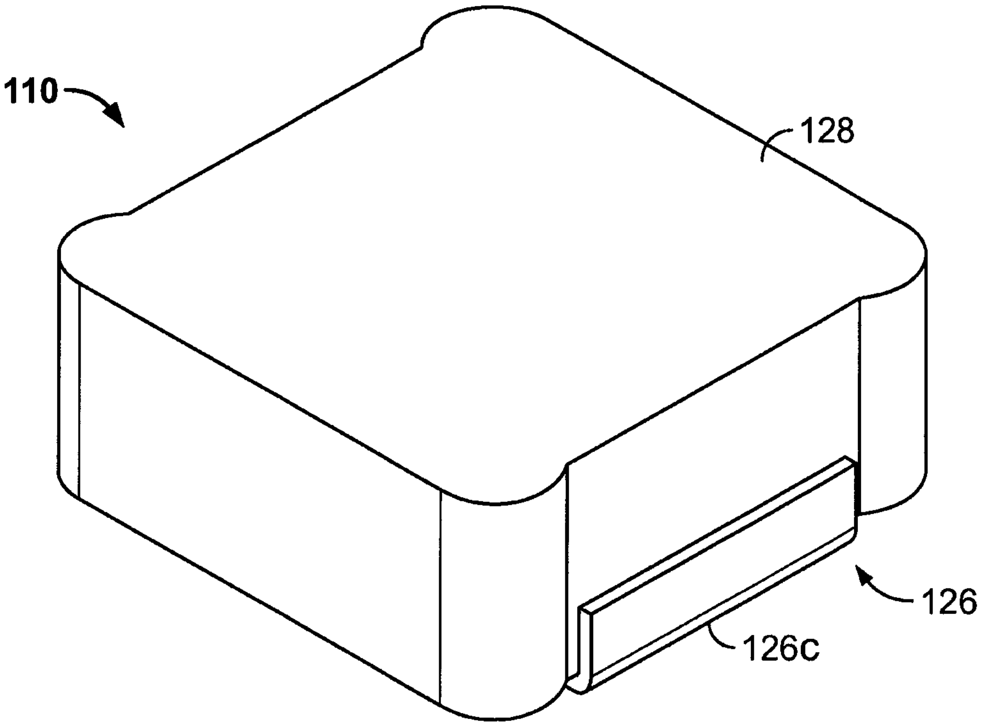
FIG. 14 is a perspective view of the electronic component of FIG. 8, showing the component from above and the outer body of the component in its normal opaque condition.
Figure 15:
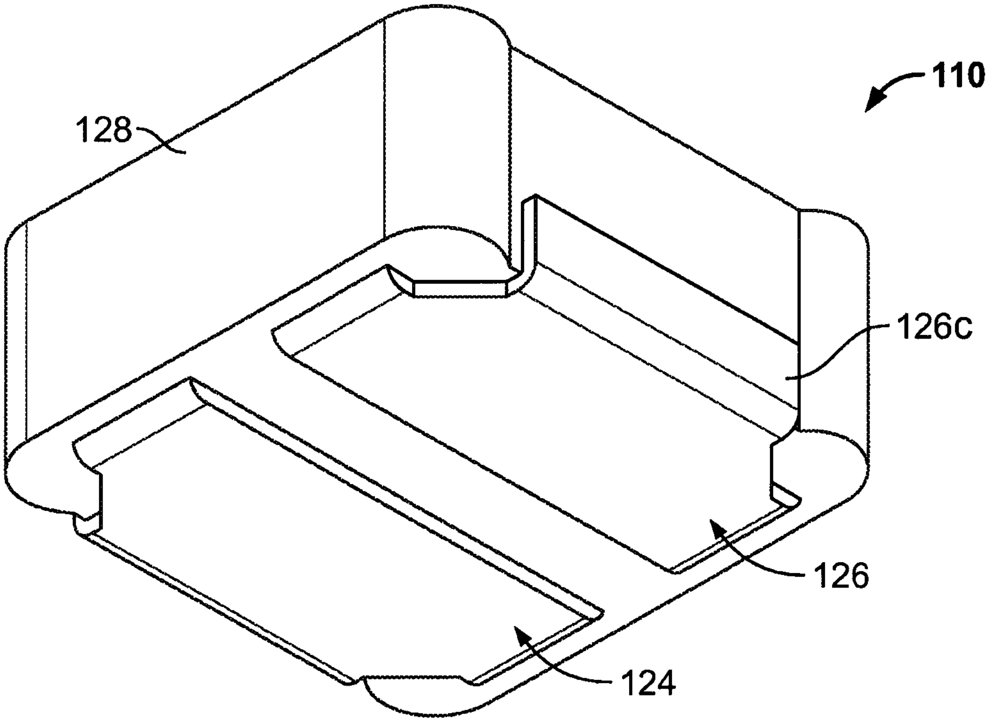
FIG. 15 is a perspective view of the electronic component of FIG. 8, showing the component from below and the outer body of the component in its normal opaque condition.

Another difference between component 110 and component 10 is that the first and second wire ends 122*a* and 122*b* of component 110 are bent around post members 124*a-b* and 126*a-b* extending from terminals 124 and 126, thereby connecting the wire ends 122*a-b* to their respective terminals 124 and 126. In a preferred form, the wire ends are welded to the terminal posts 124*a-b* and 126*a-b* and the connection is encased in the mixture making up outer body 128, as shown in FIGS. 11 and 12.

The mixture that makes up outer body 128 may be the same as that discussed above with respect to component 10, and the outer body 128 may either be potted and cured or compression molded as discussed above. However, after the component is removed from the mold, tabs 124*c* and 126*c* of terminals 124 and 126 are bent around their edges of outer body 128. This forms the terminals 124 and 126 into an easily accessible L shaped terminal or soldering pad with a larger surface area for soldering the component 110 to lands on a PCB. Thus, solder may connect to the bottom of terminals 124 and 126 and to the side metal formed by tabs 124*c* and 126*c*.

In the embodiment shown in FIGS. 8-11, the terminals 124 and 126 are connected together and are separated once the component 110 is removed from the mold by simply grinding through the central metal portion connecting the two terminals 124 and 126. By having the terminals 124 and 126 initially connected together, handling of the terminals is made more simple and the manufacture of component 110 is made more easy. Further, the symmetrical design of the terminals 124 and 126 ensures that their orientation has minimal effect on the manufacturing of component 110. Once ground, the terminals will be separated from one another as shown in FIGS. 11-15.

It is well known in the art to use a dry mold or dry press process to form a magnetic mixture around a wire coil, thereby creating a green body which can be further heated (i.e., a secondary heating) to form an electrical component. Such processes often require significant forces that can damage or destroy certain types, configurations, or gauges of wire. An electrical component that has been damaged via such processes may short or otherwise fail. Further, the type and extent of damage that may occur during such processes can vary depending on the placement, direction, or magnitude of the compression forces involved, making this problem difficult to detect and address, and possibly resulting it some components passing internal tests only to fail after shipment.

In order to avoid such shortcomings, the tack core 20, 120 may be used to help retain and/or protect the configuration of the wound wire 22, 122 and help it withstand the various forces and pressures it may be subjected to during manufacture. Furthermore, instead of employing a dry press process to mold the mixture around the wire, the mixture making up outer body 28, 128 may be heated to a liquid that can then be dispersed (e.g., injected or disposed) over at least a portion of the wound wire 22, 122 to avoid exposing the wire to the damaging forces of a dry press process. For example, in one form, the mixture may be liquefied and dispersed over the wire 22, 122, the tack core 20, 120 and/or the terminals 24, 124 and 26, 126 via an injection molding, compression molding or other molding process, and then hardened to form outer body 28, 128. After the liquid mixture has been formed into the outer body 28, 128 via the injection molding process, the component 10, 110 may be removed from the mold. If a common terminal is used, rather than separate terminals, the terminal may be ground into separate terminals 24, 26 and 124, 126 to produce a multi-terminal component.

Although the embodiments discussed herein have illustrated the components 10 and 110 as inductors with one winding and two terminals, it should be understood that the above concepts may be applied to parts with more than two terminals and/or more than one wire. For example, dual wound inductors, transformers and the like may be made using similar processes or methods. Furthermore, those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

What is claimed is:

1. An electronic component comprising:

a wire wound about a central axis in a plurality of turns forming a coil having a central opening, the wire having first and second wire ends;

the coil having a first row and a second row axially offset from the first row;

the first row of the coil including a first outer turn and a first inner turn about the central axis, the first inner turn having a smaller diameter than the first outer turn;

the second row of the coil including a second outer turn and a second inner turn about the central axis, the second inner turn having a smaller diameter than the second outer turn;

the coil having a transition connecting the first inner turn to the second inner turn;

wherein the first and second wire ends are connected to or form terminals for mounting the component to a circuit; and an overmolded outer body made of a mixture of magnetic and/or non-magnetic material and binder, the coil and at least a portion of the terminals embedded in the outer body, at least a portion of the terminals exposed through the outer body for mounting the component.

2. The electronic component of claim 1 wherein the outer body is a compression or injection molded body and is made-up of more non-magnetic material than magnetic material.

3. The electronic component of claim 1 wherein the outer body is a compression or injection molded body and is made-up of more magnetic material than non-magnetic material.

4. The electronic component of claim 1 further including a preformed core, separate from the outer body in which the coil is embedded, that is disposed at least partially within the central opening of the coil.

5. The electronic component of claim 4 wherein the preformed core is a tack core having a flanged end with a center post extending upward therefrom with the central opening of the coil positioned about the center post and at least a portion of the flanged end being positioned below at least a portion of the coil.

6. The electronic component of claim 4 wherein the preformed core is made of the same mixture of magnetic and/or non-magnetic material and binder as the outer body.

7. The electronic component of claim 4 wherein the preformed core is made of a second mixture of magnetic and/or non-magnetic material and binder different than the mixture of magnetic and/or non-magnetic material and binder of the outer body.

8. The electronic component of claim 1 wherein the wire is a flat, insulated wire wound into a plurality of rows coaxially configured about the central axis.

9. The electronic component of claim 8 wherein the flat wire has a cross section having wide opposing sides spaced apart by narrow opposing edges, wherein each side of the cross section represents a side-face of the flat wire and each edge of the cross section represents an edge-face, and wherein the plurality of rows are stacked edge-face to edge-face rather than side-face to side-face.

10. The electronic component of claim 1 wherein the wire is a round, insulated wire wound into a plurality of rows coaxially configured about the central axis.

11. The electronic component of claim 10 wherein the round wire of the first row is wound inward toward the central axis in turns of decreasing diameter and the wire of subsequent rows alternating between winding in turns of increasing diameter and decreasing diameter with a final row of the plurality of rows having turns increasing in diameter and transitioning to the second wire end.

12. The electronic component of claim 1 wherein the first and second wire ends are connected to posts of the terminals, the connections between the first and second wire ends and the terminals embedded in the outer body.

13. An electronic component comprising:

a wire wound about a central axis in a plurality of turns forming a coil having a central opening, the wire having first and second wire ends;

the coil having a first row and a second row axially offset from the first row;

the first row of the coil including a first outer turn and a first inner turn about the central axis, the first inner turn having a smaller diameter than the first outer turn;

the second row of the coil including a second outer turn and a second inner turn about the central axis, the second inner turn having a smaller diameter than the second outer turn;

the coil having a transition connecting the first inner turn to the second inner turn;

wherein the first and second wire ends are connected to or form terminals for mounting the component to a circuit; and an overmolded body encasing at least a portion of the coil such that the body contacts and extends along a substantial portion of a length of outer winding of the first row and the outer winding of the second row, the body encasing at least a portion of the terminals such that at least a portion of the terminals are exposed for mounting the component.

14. The electronic component of claim 13 further including a preformed core that is disposed at least partially within the central opening of the coil.

15. The electronic component of claim 14 wherein the preformed core is a tack core having a flanged end with a center post extending upward therefrom with the central opening of the coil positioned about the center post and at least a portion of the flanged end being positioned below at least a portion of the coil.

16. The electronic component of claim 14 wherein the preformed core is made of a similar material as the overmolded body.

17. The electronic component of claim 14 wherein the preformed core is made of a first mixture of material and the overmolded body is made of a second mixture of material different than the first mixture of material.

18. The electronic component of claim 13 wherein the wire is a flat, insulated wire wound into a plurality of rows coaxially configured about the central axis.

19. The electronic component of claim 18 wherein the flat wire has a cross section having wide opposing sides spaced apart by narrow opposing edges, wherein each side of the cross section represents a side-face of the flat wire and each edge of the cross section represents an edge-face, and wherein the plurality of rows are stacked edge-face to edge-face rather than side-face to side-face.

20. The electronic component of claim 13 wherein the wire is a round, insulated wire wound into a plurality of rows coaxially configured about the central axis.

21. The electronic component of claim 20 wherein the round wire of the first row is wound inward toward the central axis in turns of decreasing diameter and the wire of subsequent rows alternating between winding in turns of increasing diameter and decreasing diameter with a final row of the plurality of rows having turns increasing in diameter and transitioning to the second wire end.

* * * * *